March 27, 1956 H. D. REY 2,739,630
APPARATUS FOR SPLITTING COCONUTS
Filed May 11, 1953 2 Sheets-Sheet 1
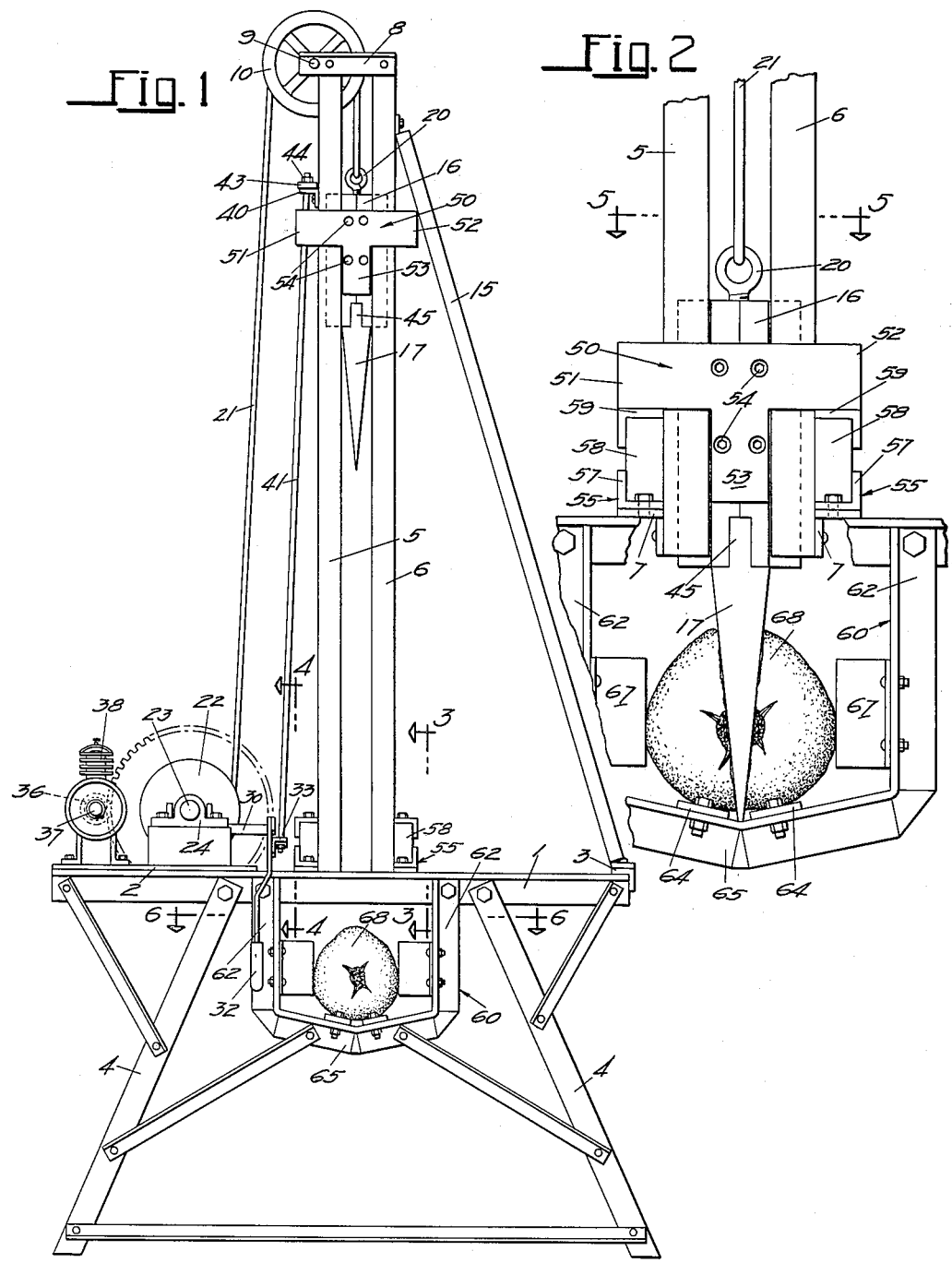
INVENTOR.
HENRI DANIEL REY
BY
Boyken, Mohler & Beckley
ATTORNEYS March 27, 1956  H. D. REY  2,739,630
APPARATUS FOR SPLITTING COCONUTS
Filed May 11, 1953  2 Sheets-Sheet 2
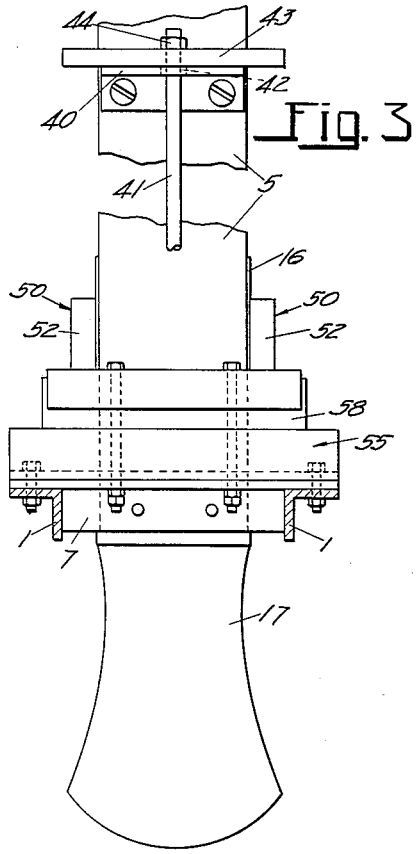
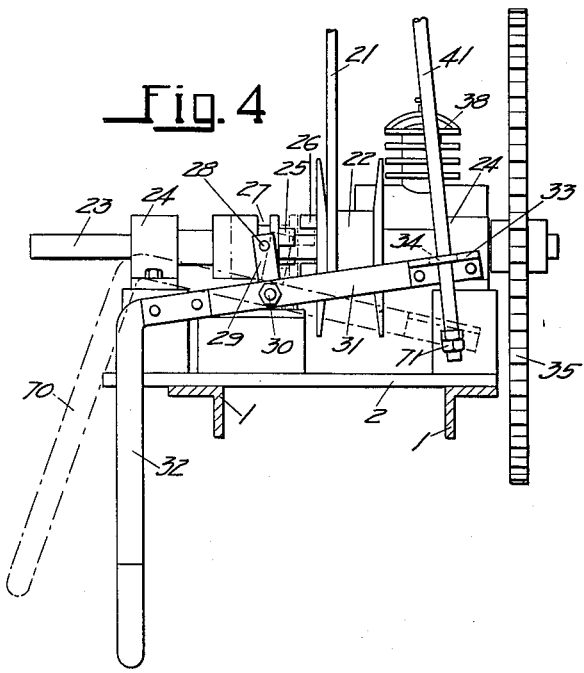
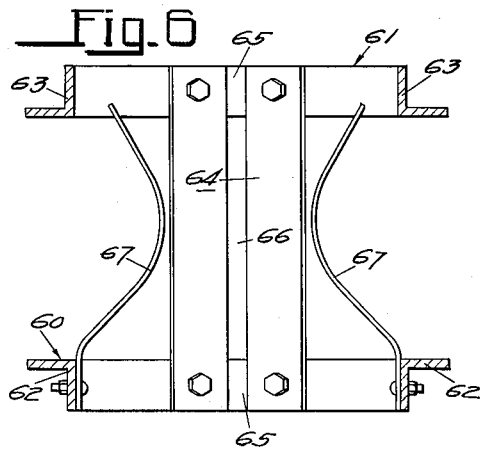
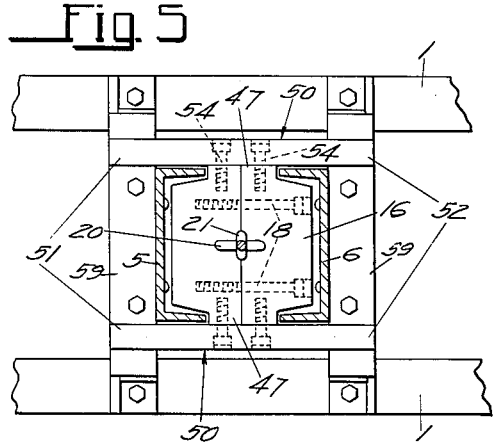
INVENTOR.
HENRI DANIEL REY
BY
Boyken, Mohler & Beckley
ATTORNEYS

United States Patent Office 2,739,630
Patented Mar. 27, 1956

2,739,630

APPARATUS FOR SPLITTING COCONUTS

Henri Daniel Rey, Papeete, Tahiti

Application May 11, 1953, Serial No. 354,253

9 Claims. (Cl. 146—7)

This invention relates to a machine for splitting coconuts and the like and has for one of its objects the provision of a relatively light weight, rugged and easily operated machine for more efficiently splitting coconuts than has been done heretofore.

Coconuts have a hard shell that encloses the kernel or meat, and around this shell is a relatively thick fibrous husk. To remove the kernel or meat, the husk, shell and meat are split, and heretofore this has been done by use of an axe wielded by the arm of a workman. The operation is a tiring one that demands considerable resting by the operator, and it is the ordinary thing for the operator to use too light an axe for the job, since the heavier axe requires the expenditure of more energy, with the result that many of the coconuts are not split at one blow. In such instances the operator attempts to break the partially split coconuts, which results in additional loss of time.

As to the result of hand splitting, or splitting by a hand wielded axe, the coconuts are not split with uniform accuracy. This makes it more difficult for other workmen to dig the meat out of the hard shell. If the nuts are accurately split, the operation of digging or cutting the meat out of the shells would follow a uniform routine that is almost automatic, but where one half is large and the other half is small, the operator must change his actions to conform to the different shapes and sizes, with the result that time is lost and the work is harder for the operator.

With the present invention, each coconut is split with scarcely more effort on the part of the operator than that of placing each coconut on a support for the same. In fact, the operator usually is seated, and it is possible for him to split 5,000 or more coconuts during a normal working day, in the same time that 1,500 were formerly split, and with only a fraction of the effort that has heretofore been required to split the latter amount.

Also, with the present invention, provision is made for splitting the smaller coconuts in less time than is required for splitting the larger ones. Heretofore practically the same time has been required for large and small, and as coconuts may run from about 4 inches to about 10 inches in diameter, there is a wide variation in the time required to split the different sizes.

With the present invention, the coconuts are accurately and uniformly split at a single blow for each nut, thus obviating the necessity for trying to break partially split coconuts.

Other objects and advantages will appear in the description and in the drawings, such as safety features to protect the workman.

In the drawings,

Fig. 1 is a front elevational view of the machine as seen from the side into which each coconut is fed for splitting. The splitting blade is shown at the top of its stroke, just before release for descending, and a coconut is shown in position for splitting.

Fig. 2 is an enlarged fragmentary elevational view (partly broken away) of the coconut holder and support with the splitting blade in a position at the lower end of its stroke splitting the coconut.

Fig. 3 is an enlarged fragmentary sectional view taken along about line 3—3 of Fig. 1, showing the splitting blade at the lower end of the stroke, and also showing the upper end of the control rod for automatically releasing the splitting blade when the latter reaches the upper end of its stroke.

Fig. 4 is an enlarged sectional view taken along line 4—4 of Fig. 1 showing the manual and part of the automatic control for elevating and releasing the splitting blade, the control being shown in a position in which the blade is released.

Fig. 5 is a sectional view taken along line 5—5 of Fig. 2.

Fig. 6 is an enlarged sectional view along line 6—6 of Fig. 1, but with the coconut removed.

In detail, the invention as shown, comprises a pair of horizontally extending frame members 1 in side by side spaced relation supporting a platform or table 2 on one of their corresponding ends that also functions as a cross frame member, and the other corresponding ends of members 1 are connected by a cross frame member 3.

Legs 4 and suitable bracing for said legs extend downwardly from members 1 at points spaced from corresponding midportions of the latter. Said midportions of members 1 support a pair of vertically extending channel members 5, 6 extending upwardly from said frame members. Said channel members are spaced apart with their open sides in opposed relation and in positions extending between said frame members 1. The lower ends of said channel members are secured to parellel pieces 7 (Fig. 2) respectively, said pieces being angle strips extending between members 1.

Said channel members 5, 6 are secured together at their upper ends in any suitable manner, such as by cross pieces 8 and which cross pieces may project past the member 5 for rotatably supporting a shaft 9 that has a pulley wheel 10 thereon. The web of channel member 5 is cut away from its upper end to enable the wheel 10 to extend at one side to about the center of the space between the webs of members 5, 6.

Any suitable brace or braces 15 are provided for connecting the upper ends of channel members 6 with the frame members 1 through connection with cross frame member 3, or in any other suitable manner. These braces stabilize the channel members at the side of member 6 that faces away from member 5.

The channel members 5, 6 cooperate to form vertically extending guide means for a weight 16 and for a splitting blade 17 secured to said weight, and for other elements to be described. This weight 16 may be vertically divided into halves (Fig. 5) that are secured together by several sets of screws 18. The plane of division of said weight may be coincidental with a plane bisecting the space between the members 5, 6 and as screws 18 extend perpendicular to such plane, it will be seen that they cannot accidentally become loosened and drop out for the reason that the web of member 6 extends over the heads of the screws, and to separate the halves it is necessary to remove the weight from the space between said members.

An eye 20 (Figs. 1, 2) is secured to the weight centrally thereof at its upper side, and a cable or rope 21 of wire or other suitable material is secured at one end to said eye and extends upwardly over pulley 10 and then downwardly to a horizontal winding drum 22 to which the other end of said cable is secured.

The drum 22 is rotatably supported on a shaft 23 that, in turn, is rotatably supported in bearings 24. Said bearings may be carried on the table or platform 2.

Splined onto shaft 23 is one of the elements 25 of a dog clutch or other suitable clutch, and the drum 22 carries the other element or elements of said clutch, thus providing a disengageable coupling for driving the drum when the shaft 23 is rotated and for permitting the drum to rotate freely on shaft 23 when the coupling or clutch elements are disengaged.

The element 25 is formed with an annular groove 27 into which extends a pin 28 (Fig. 4) that, in turn, is carried on one end of an arm 29. The other end of arm 29 is secured to a shaft 30 and said shaft is supported for rotation in bearings on platform 2. A horizontally extending arm 31 is secured to shaft 30 at a point intermediate the ends of said arm.

One end of arm 31 has a depending handle 32 secured thereto, and the other end of arm 31 carries a plate 33 that is formed with a horizontally elongated opening or slot 34 therein, which slot extends longitudinally of the arm 31.

A gear 35 is also secured on shaft 23, and the teeth of this gear 35 mesh with the teeth of a pinion gear 36 that, in turn is secured to the power shaft 37 of any suitable motor 38. The motor shown is a small internal combustion motor, but it may obviously be an electric motor or any other source of power for rotating pinion 36.

From the description thus far, it will be seen that when the clutch elements are engaged and the motor is running, the cable 21 will be wound on the drum 23 and the weight 16 and all elements secured thereto will be drawn up the guides 5, 6.

Secured to the outer side of channel member 5 near its upper end is a laterally projecting bracket plate 40 (Figs. 1, 3). A generally vertically extending rod 41 relatively loosely extends at its upper end through an opening 42 in said plate 40 and loosely extends at its lower end through slot 34 in plate 33. The upper end of rod 41 may also be connected with or secured to a horizontally extending bar 43 or may extend through said bar centrally of the latter and have a nut 44 on its end above said bar so that upon elevating said bar 43 the rod 41 will be elevated. The said bar 43 may be so close to the adjacent channel member 5 that it will have no substantial rotation, and the length of said bar is such that its opposite ends project past the opposite side of channel member 5 (Fig. 3).

Blade 17 is similar to the blade of an axe such as is used for splitting coconuts, and the weight 16 and said blade are rigidly secured together by any suitable means, such as by providing the blade with a shank 45 that extends into complementarily formed recesses in the lower adjacent sides of the halves of said weight (Fig. 2). A lower set of screws 18 (Fig. 5) may extend through said shank, or a separate set of screws or bolts may be used. In any event, the blade 17 is normally rigid with weight 16 and can be removed for replacement or for sharpening.

It is to be noted that the blade is fully disposed within the confines of the channel members 5, 6 and is in flat opposed relation to the webs or bottoms of channel members 5, 6, which is found to be a safer way of mounting the blade.

Weight 16 is formed with projections 47 that are between the adjacent edges of the sides of members 5, 6 so that the outer surfaces of said projections are substantially flush with the outer surfaces of said sides. The weight being split vertically has half of each projection 47 on each half of the weight. Inasmuch as weight 16 is preferably vertically elongated, these projections 47 coact with the edges of the channel members to provide elongated guide and stabilizing means for the weight during its ascent and descent.

Secured rigidly to each of the projections 47 at opposite sides of the weight are cross bars 50 each of which extends transversely past the channel members 5, 6 close to the latter and the corresponding ends 51 of said cross bars project beyond the said members 5 while the other corresponding ends 52 project beyond the members 6. A leg 53 depends from each bar 50 centrally thereof and said bars and legs are secured to the projections 47 of weight 16 by screws 54 or by any other suitable means.

Above the cross pieces 7 are angle strips 55 that are rigidly secured to said cross pieces. Each strip 55 has one of its sides horizontal and with the free edges of such sides respectively against the webs of channel members 5, 6 with the other legs 57 vertical and extending upwardly spaced from and parallel with said webs (Fig. 2). Thus a base holder is provided alongside each of the channel members 5, 6 for a rectangular rubber or resilient block 58.

Each block 58 projects above the vertical leg 57 of each strip 55 and the upper side of each block is covered by one leg 59 of an upper angle strip that is similar to strip 55, and the other leg of the upper angle strip is coplanar with each leg 57 and extends toward the latter.

These blocks 58 including the upper and lower angle strips project at their opposite ends outwardly of opposite sides of the channel members 5, 6 so that their projecting ends will be below the projecting ends 51, 52 of the cross bars 50. Thus when the weight 16 and the said bars drop from an elevated position, the said projecting ends of the cross bars 50 will be stopped by the projecting ends of the bumper assembly that is made up of the rubber blocks 58 and the angle strips that are above and below said blocks.

Below the frame members 1 and rigidly secured thereto is a coconut holder comprising a pair of aligned U-shaped members 60, 61. Member 60 has the upper ends of its legs 62 secured to one frame member 1 while the upper ends of the legs 63 of the other U-shaped member 61 are secured to the other member 1.

The lower closed ends 65 of said U-shaped members preferably extend slantingly downwardly from the lower ends of said legs 62 and legs 63 to a point intermediate their elevated ends, and a coconut support in the form of parallel elements 64 extends horizontally across the space between the closed ends of said U-shaped members and are supported at their ends on said closed ends at opposite sides of a vertical plane bisecting the spaces between the pairs of legs 60, 61 (Fig. 6). A space 66 is between elements 64 and is directly below the splitting blade 17 so that the edge of the blade may enter said space.

By the above structure, the elements 64 provide a substantially V-shaped support for supporting and for centering a coconut below blade 17. Also the pair of U-shaped elements 60, 61 respectively provide a laterally opening inlet between legs 62 for moving a coconut onto elements 64, while the outlet for the split coconut is between legs 63 of element 61. Thus horizontally extending passageway with said inlet at one end and said outlet at the other end has a pair of horizontally extending flat or leaf springs 67 at opposite sides thereof and which define the lateral sides of the passageway along the length thereof between elements 60, 61. Said springs are secured at one of their ends to each of the legs 62 and they extend convergently toward each other. These springs are adapted to yieldably engage the opposite sides of a coconut 68 when the latter is slipped into position on elements 64 between and past the legs 62 of member 60, so as to hold each coconut centrally below blade 17 during a splitting operation.

In operation, the engine or motor 38 being in operation, the blade 17 and the weight secured thereto will remain in its lowermost position as long as the clutch elements 25, 26 are disconnected and they will remain disconnected until the operator grasps handle 32 and moves it to the dot dash position 70 (Fig. 4). Such movement of the handle will also cause plate 33 to swing down until it is in substantial engagement with nut 71 that is on the lower end of the rod 41.

Once the clutch elements are engaged the cable 21 will commence to elevate the blade 17, and as soon as the blade clears the coconut holder the operator will position a coconut 68 in the latter on base elements 64 and between springs 67, as already described. Springs 67 and the elements 64 will center the coconut over space 64.

If the coconut 68 is relatively small, the operator may push the handle 32 to the full line position (Fig. 4) as soon as he thinks it is high enough to split the nut thereby disconnecting the clutch elements 25, 26 and permitting the blade to drop before it reaches the upper ends of the channel members or guides 5, 6. However, in the event the nut is relatively large or of average size, the operator need pay no more attention to the apparatus for the movement inasmuch as the projecting ends 51 of cross bar 50 will automatically engage the ends of bar 43 when the blade reaches its maximum elevation thereby elevating the rod 41 and automatically swinging arm 31 upwardly to automatically disconnect the clutch elements. The splitting blade will thus be automatically released and will fall, splitting the nut 68.

The operator will then swing the handle 32 back to postion 70, and as the blade 17 clears the split coconut, the halves of the latter are pushed out of the holder between legs 63 by a whole coconut that is inserted into the holder between legs 62 for splitting and the operation is repeated.

The supporting legs 4 may be longer or shorter as desired. In most instances the operator is seated alongside the coconut holder and the coconuts are delivered to him for insertion into the holder. Whereas an average operator can split about 1,500 coconuts a day by the hand method, he is enabled to split about 5,000 of the same sized coconuts in a day by the present apparatus, and this latter number can be increased as the operator learns by experience, the points where he can manually release the blade to split coconuts of different diameters.

I claim:

1. A coconut splitter comprising; a vertically disposed splitting blade having a downwardly directed lower cutting edge; means supporting said blade for movement in a vertically extending path from an elevated position to a lowered position and vice versa, a coconut holder at the lower end of said path having a base for supporting a coconut in said path for splitting by said blade upon movement of the latter from said elevated position to said lowered position, power actuated means operably connected with said blade for moving the latter to said elevated position, and means for disconnecting said blade from said power actuated means upon movement of said blade to said elevated position to permit falling of said blade by gravity to said lowered position upon such release of said blade, said blade being free for falling by gravity to said lowered position upon said blade being so disconnected from said power means.

2. A coconut splitter comprising; a vertically disposed splitting blade having a downwardly directed lower cutting edge, means supporting said blade for movement in a vertically extending path from an elevated position to a lowered position and vice versa, a support positioned at the lower end of said path for supporting a coconut thereon in said path for splitting by said blade, power driven means connected with said blade for moving it to said elevated position, said means including a disengageable coupling and said blade being free for falling in said path by gravity to said lowered position when said coupling is disengaged, disengaging means connected with said blade for movement therewith, means engageable with said disengaging means connected with said coupling and actuatable for movement by movement of said disengaging means when said blade approaches its said elevated position in its movement to the latter position for disengaging said coupling whereby said blade will fall by gravity.

3. A coconut splitter comprising; a vertically disposed splitting blade having a downwardly directed lower cutting edge, means supporting said blade for movement in a vertically extending path from an elevated position to a lowered position and vice versa, a support positioned at the lower end of said path for supporting a coconut thereon in said path for splitting by said blade, power driven means connected with said blade for moving it to said elevated position, said means including a disengageable coupling and said blade being free for falling in said path by gravity to said lowered position when said coupling is disengaged, disengaging means connected with said blade for movement therewith, means engageable with said disengaging means connected with said coupling and actuatable for movement by movement of said disengaging means when said blade approaches its said elevated position in its movement to the latter position for disengaging said coupling whereby said blade will fall by gravity, manually actuatable means connected with said coupling and movable under manual manipulation for disengaging said coupling at any time during movement of said blade to said elevated position.

4. A coconut splitter comprising; a generally V-shaped support for centering and supporting a coconut thereon, guides extending vertically upwardly from said support, a splitting blade having a downwardly directed cutting edge, said blade being held by said guides for vertical movement from a lowered position with said cutting edge along the apex of said V-shaped support to an elevated position at the upper end portions of said guides and vice versa, power actuated means connected with said blade for elevating said blade to said elevated position, said blade being free for falling by gravity to said lowered position when disengaged from said power actuated means, a releasable coupling connecting said power actuated means with said blade and means connected with said blade and movable therewith to said elevated position engageable with said coupling upon its said movement for releasing said coupling for freeing said blade so that the latter will be free to fall for splitting a coconut on said support.

5. A coconut splitter comprising; a generally V-shaped support for centering and supporting a coconut thereon, guides extending vertically upwardly from said support, a splitting blade having a downwardly directed cutting edge, said blade being held by said guides for vertical movement from a lowered position with said cutting edge along the apex of said V-shaped support to an elevated position at the upper end portions of said guides and vice versa, power actuated means connected with said blade for elevating said blade to said elevated position, said blade being free for falling by gravity to said lowered position when disengaged from said power actuated means, a releasable coupling connecting said power actuated means with said blade and means connected with said blade and movable therewith to said elevated position engageable with said coupling upon its said movement for releasing said coupling for freeing said blade so that the latter will be free to fall for splitting a coconut on said support, and coconut holding means positioned adjacent to said support yieldably engaging the opposite sides of a coconut on said support when such coconut is moved onto the latter.

6. A coconut splitter comprising; a support for a coconut, guides extending upwardly from said support, a splitting blade having a downwardly directed cutting edge, a weight rigid with said blade above the latter and slidably held by said guides for vertical movement from a lowered position with said cutting edge at said support to an elevated position at the upper end portions of said guides and vice versa, a cable connected with said weight, a pulley at the upper ends of said guides over which said cable extends, a rotary winding drum on which said cable is windable for elevating said weight and blade to said elevated position when said drum is rotated in one direction, a motor, a disengageable coupling connecting said motor with said drum for rotating said drum in said one direction upon actuation of said motor, said drum being free for rotation in a direction releasing said weight and blade when said coupling is disengaged, and a device actuatable for movement connected with said coupling for disengaging the latter upon said movement of said weight to said elevated position, and means movable with said weight and into engagement with said device when said weight is moved to said elevated position for actuating said device for said movement thereof.

7. A coconut splitter comprising; a support for a coconut, guides extending upwardly from said support, a splitting blade having a downwardly directed cutting edge, a weight rigid with said blade above the latter and slidably held by said guides for vertical movement from a lowered position with said cutting edge at said support to an elevated position at the upper end portions of said guides and vice versa, a cable connected with said weight, a pulley at the upper ends of said guides over which said cable extends, a rotary winding drum on which said cable is windable for elevating said weight and blade to said elevated position when said drum is rotated in one direction, a motor, a disengageable coupling connecting said motor with said drum for rotating said drum in said one direction upon actuation of said motor, said drum being free for rotation in a direction releasing said weight and blade when said coupling is disengaged, and a device actuatable for movement connected with said coupling for disengaging the latter upon said movement of said means, a resilient bumper at the lower ends of said guides, means rigid with said weight engageable with said bumper for supporting said weight when it is in its lowermost position, means rigidly connected with said weight and said blades for movement therewith engageable with said device upon movement of said weight to said elevated position for actuating said device to disengage said coupling whereby said drum will be free for rotation in a direction releasing said weight and said blade for falling by gravity.

8. A coconut splitter comprising; a holder for a coconut in the form of a horizontally disposed passageway having an inlet at one end and an outlet at the opposite end for a coconut, and a generally V-shaped bottom intermediate said ends on which such coconut is adapted to be positioned on its way from said inlet to said outlet, a vertically disposed blade having a downwardly directed cutting edge, means supporting said blade for vertical movement from a lowered position with its cutting edge adjacent to said bottom through the upper side of said passageway to an elevated position substantially above the latter and vice versa, power actuated means for so moving said blade from said lowered position to said elevated position, said power actuated means including a disengageable coupling connecting said blade with a source of power and means for disengaging said coupling when said blade is at said elevated position for releasing said blade for downward movement by gravity to said lowered position for splitting a coconut when the latter is on said bottom and between said inlet and said outlet said passageway having opposed sides supported for yieldable engagement with opposite sides of such coconut when the latter is in said passageway and on said bottom, for yieldably holding said coconut during splitting of the latter by said blade.

9. A coconut splitter comprising; a holder for a coconut in the form of a horizontally disposed passageway having an inlet at one end and an outlet at the opposite end for a coconut, and a bottom intermediate said ends on which such coconut is adapted to be positioned on its way from said inlet to said outlet, a vertically disposed blade having a downwardly directed cutting edge, means supporting said blade for vertical movement from a lowered position with its cutting edge adjacent to said bottom through the upper side of said passageway to an elevated position substantially above the latter and vice versa, power actuated means for so moving said blade from said lowered position to said elevated position, said power actuated means including a disengageable coupling connecting said blade with a source of power and means for disengaging said coupling when said blade is at said elevated position for releasing said blade for downward movement by gravity to said lowered position for splitting a coconut when the latter is on said bottom and between said inlet and said outlet, said passageway having lateral side walls for yieldable engagement with opposite sides of a coconut on said bottom, and said bottom being substantially V-shape for centering such coconut below said blade.

References Cited in the file of this patent

UNITED STATES PATENTS

| 1,304,426 | Welch | May 20, 1919 |
| 1,327,331 | Knapp | Jan. 6, 1920 |
| 1,443,689 | Kanygin | Jan. 30, 1923 |
| 1,995,441 | Urschel | Mar. 26, 1935 |
| 2,071,853 | Randall et al. | Feb. 23, 1937 |
| 2,373,584 | Malicay | Apr. 10, 1945 |

FOREIGN PATENTS

| 11,620 | Great Britain | 1914 |